United States Patent [19]

Shaffer

[11] Patent Number: 4,558,856

[45] Date of Patent: Dec. 17, 1985

[54] HOLDER FOR VISE PARALLELS

[76] Inventor: Robert H. Shaffer, 1103 Burgoyne St., Mountain View, Calif. 94043

[21] Appl. No.: 614,369

[22] Filed: May 29, 1984

[51] Int. Cl.⁴ .............................................. B23Q 3/06

[52] U.S. Cl. .................................................... 269/277

[58] Field of Search ............... 294/99, 99 S, 93, 86.24, 294/86.28, 86.32; 269/254 R, 157, 275, 277, 264, 258, 239, 257, 271; 81/424

[56] References Cited

U.S. PATENT DOCUMENTS

| | | | |
|---|---|---|---|
| 494,722 | 4/1893 | Petsch | 269/157 |
| 2,815,777 | 12/1957 | Iraids | 81/424 |
| 3,891,201 | 6/1975 | Clugage | 269/275 |

FOREIGN PATENT DOCUMENTS

| | | | |
|---|---|---|---|
| 2040782 | 9/1980 | United Kingdom | 294/99 R |

*Primary Examiner*—Robert C. Watson
*Attorney, Agent, or Firm*—Townsend and Townsend

[57] ABSTRACT

A holder for a vise for releasably retaining a pair of parallels against the jaws of a vise. The holder includes a spring body having a pair of elongated sides interconnected by a spring band which causes the sides to be biased away from each other when the ends of the band are brought toward each other. The outer end of each side has an end member pivotally mounted thereon, each end member having a flat outer face for engagement with a respective parallel to urge the parallel against the jaw of a vise when the body is in the space between the vise jaws. The holder is manually handled to position the end members against the parallels and to remove the holder from the space between the jaws of the vise.

8 Claims, 3 Drawing Figures

HOLDER FOR VISE PARALLELS

This invention relates to improvements in the mounting of work pieces in vises and, more particularly, to a holder for keeping the parallels of a vise against the jaws of the vise.

BACKGROUND OF THE INVENTION

In mounting a work piece in a vise, it is oftentimes necessary to use a pair of plates known as parallels. These parallels are mounted adjacent to respective jaws of the vise and have upper margins which act as reference surfaces for the mounting of the work piece between the vise jaws. These parallels are typically rigid metallic bars which must be retained against the jaws to properly position the work piece while machining or other work is being performed on the work piece itself.

In the past, a number of different devices have been used to keep the parellels against the jaw surfaces. For instance, coil springs have been placed in the space between the parallels in engagement with the parallels themselves with the springs being under compression. However, this is a dangerous technique because the springs can become dislodged and hurdle through space. This could possibly cause bodily injury to a workman adjacent to the work piece. Other, more elaborate devices have been used but these have been expensive to produce and complex to use, and they require considerable amount of space for use in holding the parallels in place.

Because of these drawbacks, a need has arisen for improvements in the holding of parallels against vise jaws. This invention satisfies this need.

SUMMARY OF THE PRESENT INVENTION

The present invention is directed to a holder for releasably retaining a pair of parallels against respective jaw surfaces of a conventional vise. The holder includes a body of spring material having a pair of sides interconnected by a spring crosspiece or member. Each side has a pivotally mounted end member thereon with each end member having a flat side face for engaging a parallel. The body itself can be narrow in width so it can be easily placed in the space between the jaws of a vise and against the parallels without interfering with a work piece on the parallels themselves. The holder is simple and rugged in construction, can be made inexpensively, is easy to use, and can be conveniently placed in a tool chest when not needed.

The primary object of the present invention is to provide an improved holder for holding parallels against the jaws of a vise wherein the holder is simple and rugged in construction, is inexpensive to produce and easy to use, and provides a positive holding force against the parallels of a vise so that a work piece will be accurately positioned on the vise while the parallels are held in place.

Other objects of this invention will become apparent as the following specification progresses, reference being had to the accompanying drawing for an illustration of the invention.

Figure 2:
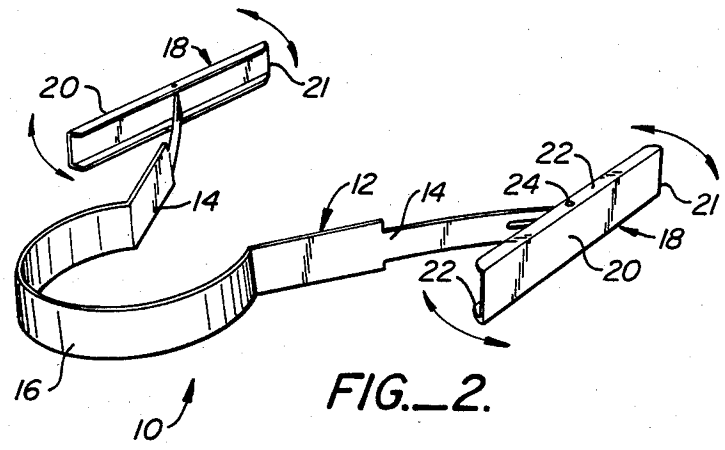
FIG. 2 is an enlarged, perspective view of the holder of the present invention.

The holder of the present invention is broadly denoted by the numeral 10 and is shown in FIG. 2 as comprising a body 12 of spring steel which is formed and shaped to present a pair of relatively straight strips defining sides 14 and a curved crosspiece or connecting member 16 integral with first ends of sides 14. Member 16 comprises a band which has a permanent set in it so that, at equilibrium, the sides 14 extend outwardly from member 16 in the manner shown in FIG. 2. Sides 14 thus diverge with respect to each other and extend outwardly from member 16 a sufficient distance determined by the desired size of the holder for a particular application as hereinafter described. The band or member 16 biases the sides 14 away from each other when the ends of the band are brought toward each other.

Any suitable spring steel material can be used for making body 12. The length and thickness of body 12 can be of any value. Typically, the length can be 4 to 6 inches and the thickness may be in the range of 0.030 inch to 0.075 inch.

Figure 3:
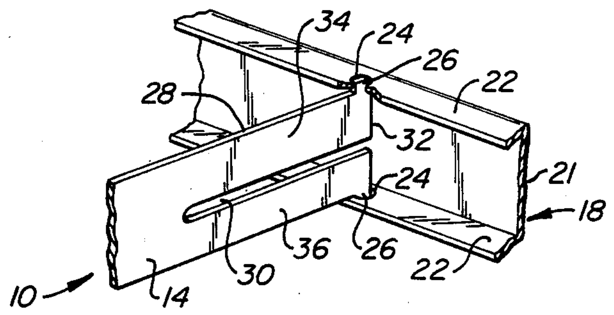
FIG. 3 is an enlarged, fragmentary view, partly in section, of the holder, showing the way in which the end members of the holder are pivotally mounted to the spring portion of the holder.

A pair of pivotally mounted end members 18 are coupled to the outer ends of sides 14. Each member 18 has a flat, outer face 20 and a pair of spaced sidewalls 22 integral with the side margins of central wall 21. Each sidewall 22 has a hole or opening 24 (FIG. 3) therethrough for pivotally receiving a tab 26 projecting from the adjacent side margin 28 of the corresponding side 14. The hole 24 is midway between the ends of the end member 18.

Each side 14 has a slit 30 extending inwardly from the end margin 32 thereof. This slit allows the side portions 34 and 36 on each side of the slit 30 to be moved toward each other to reduce the spacing between the adjacent tabs 26 so that the tabs can be easily received within holes 24 to thereby pivotally interconnect the outer end of each side 14 with the respective end member 18. Any other means for pivotally mounting end members 18 on sides 14 can be used, if desired.

Members 18 can be of any rigid material, such as steel. If desired, the same material used for strip 12 can be used for members 18. Generally, the spacing between sidewalls 22 of each member 18 is slightly greater than the width of each side 14. This feature allows tabs 26 to be quickly and easily inserted into openings 24 and permits freedom of pivotal movement of the end members 18 relative to sides 14.

Figure 1:
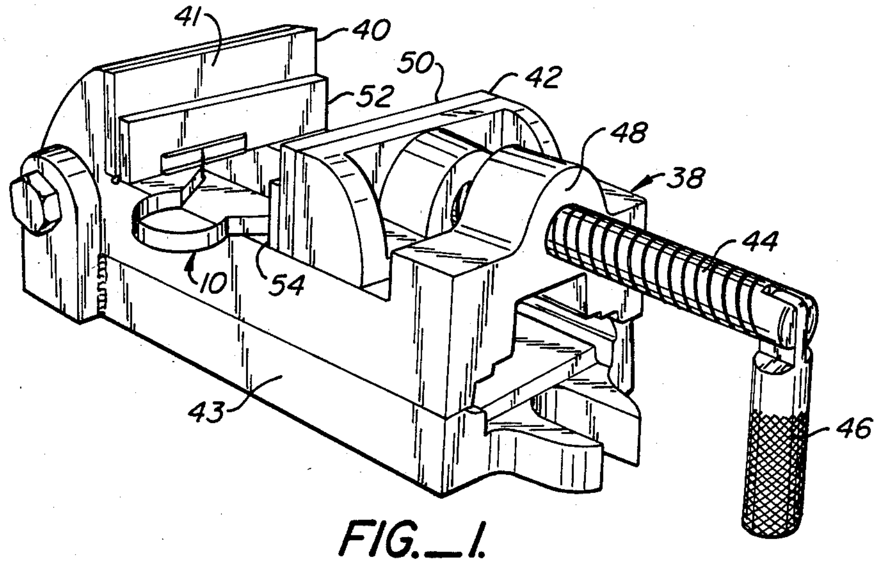
FIG. 1 is a perspective view of a conventional vise showing the way in which the holder of the present invention holds a pair of parallel plates against the jaw faces of the vise.

The holder 10 is to be used with a conventional vise, such as vise 38 shown in FIG. 1. The vise has a pair of jaws 40 and 42, jaw 40 having a flat front face 41 and being fixed to the base plate 43 of vise 38. Jaw 42 is shiftably mounted on baseplate 43 and is movable in opposed directions by a screw 44 which is rotated by manually rotating handle 46. The screw is threadably mounted in a boss 48 integral with base plate 43. Jaw 42 has a flat face 50 which is generally parallel with face 41 of jaw 40.

Holder 10 is adapted to hold a pair of parallel plates or parallels 52 and 54 against respective jaw faces 41 and 50. Parallels 52 and 54 are conventional in construction and use, and the parallels are in the shape of rigid bars and are made of steel or other suitable metal. They are used for properly positioning a work piece between jaws 40 and 42.

The parallels 52 and 54 are initially placed adjacent to respective faces 41 and 50 of jaws 40 and 42 so that the parallels are in parallelism with each other. Then, holder 10 is manually grasped and, with the fingers of the hand, sides 14 are brought toward each other until it is possible to insert end members 18 in the space between the parallels. Then, the sides 14 are allowed to expand and move away from each other, whereupon side faces 20 of end members 18 move into engagement with the exposed side faces of respective parallels 52 and 54. When this occurs, the parallels are forced against jaws 40 and 42 to releasably hold the parallels against the jaws. Then, the upper margins of the parallels can be used to position a particular work piece in a specific manner with respect to the jaws.

The parallels remain in position as shown in FIG. 1 by holder 10. When the parallels are so positioned, holder 10 is out of the way of the work piece and does not interfere with the placement of the work piece on the upper margins of the parallels.

When it is desired to remove the holder and allow the parallels to collapse or to be removed themselves, the holder is once again grasped and sides 14 are moved toward each other, whereupon end members 18 move out of engagement with respective parallels 52 and 54 so that the holder can be moved out of the space between the jaws. Then, the parallels can be removed from the vise.

The positions of the jaws can be changed even though the holder is still in place. The jaws can be moved toward or away from each other with end members still engaging parallels 52 and 54. Thus, the holder is suitable for use when mounting different work pieces on the parallels between the jaws.

Holder 10 can be made from inexpensive material and in a simple forming process. The end members 18 can be quickly assembled on the outer ends of sides 14. Moreover, the holder is simple and rugged in construction, can withstand shocks, and can be easily carried in a tool chest without requiring much space.

What is claimed is:

1. A holder for retaining a pair of parallels against the jaws of a vise comprising:
   - a body of spring material having a pair of elongated sides, each side having an outer end, said sides being movable toward and away from each other, the body having means biasing the sides away from each other; and
   - an end member for the outer end of each side, respectively, there being means pivotally mounting each end member intermediate its ends on the outer end of the respective side, said pivot means including a pair of aligned tabs on the outer end of each side, respectively, each end member having a pair of holes therethrough for receiving the tabs of a respective side, each end member having a flat face for engaging a parallel to urge the parallel against the respective jaw of a vise when the body and end members are in the space between the vise jaws.

2. A holder as set forth in claim 1, wherein said body is formed from a strip of spring material.

3. A holder as set forth in claim 1, wherein said body includes a pair of relatively straight strips defining the sides, and spring means interconnecting the proximal ends of the strips to bias the strips outwardly and away from each other.

4. A holder as set forth in claim 3, wherein said spring means includes a curved band having a pair of ends integral with adjacent ends of the strips.

5. A holder as set forth in claim 1, wherein each end member has a pair of opposed sidewalls, the holes being in the side walls of the end member.

6. A holder as set forth in claim 1, wherein each side of said body has a slit therein to allow the tabs to be moved manually toward and away from each other for insertion into the holes of the end member.

7. A holder for retaining a pair of parallels against the jaws of a vise comprising:
   - a spring body having a pair of relatively straight sides and a curved connecting band, the sides being biased away from each other when the ends of the band are brought toward each other, the connecting member being integral with the sides, each side having a second, outer end provided with a slit therein and a pair of end tabs projecting outwardly from the side in opposite directions; and
   - a pair of end members for respective sides, each end member having a central wall provided with a flat outer face and a pair of sidewalls, each sidewall having a hole therethrough, said end tabs of each side being movable toward each other for insertion into the holes of the respective end member, whereby the end members are pivotally mounted on the outer ends of the sides and the flat outer faces of the end members are engageable with respective parallels to urge the parallels against the jaws of a vise when the body and end members are between the jaws.

8. A holder as set forth in claim 7, wherein the slit of each side extends into the side from the outer end, the slit permitting the tabs to be moved toward each other.

* * * * *